United States Patent [19]

Fujimoto

[11] Patent Number: 4,901,337
[45] Date of Patent: Feb. 13, 1990

[54] X-RAY IMAGING APPARATUS

[75] Inventor: Yuichi Fujimoto, Tochigi, Japan

[73] Assignee: Kabushiki Kaisha Toshiba, Kawasaki, Japan

[21] Appl. No.: 347,699

[22] Filed: May 5, 1989

[30] Foreign Application Priority Data

May 18, 1988 [JP] Japan .................. 63-113518

[51] Int. Cl.$^4$ ............................................. H05G 1/64
[52] U.S. Cl. ............................. 378/99; 250/370.09
[58] Field of Search .................. 358/111; 378/99; 250/370.09

[56] References Cited

U.S. PATENT DOCUMENTS

| 4,383,327 | 5/1983 | Kruger | 378/99 |
| 4,736,399 | 4/1988 | Okazaki | |
| 4,809,309 | 2/1989 | Beekmans | 378/99 |

Primary Examiner—Craig E. Church
Attorney, Agent, or Firm—Finnegan, Henderson, Farabow, Garrett and Dunner

[57] ABSTRACT

AN X-ray imaging apparatus includes an image intensifier for converting an X-ray passing through an object to be examined into an optical image, a solid-state image sensor for converting the optical image into a video signal, a monitor for displaying the video signal, and an X-ray photographing apparatus for picking up an X-ray image. When a photographing mode is selected, the solid-state image sensor receives two transfer pulses during a vertical blanking period to reduce the luminance of the video signal. Electric charges stored in electric charge storage areas in the solid-state image sensor are externally discharged in response to the first transfer pulse, and the electric charges stored after the discharge are read as the video signal in response to the second transfer pulse.

12 Claims, 3 Drawing Sheets

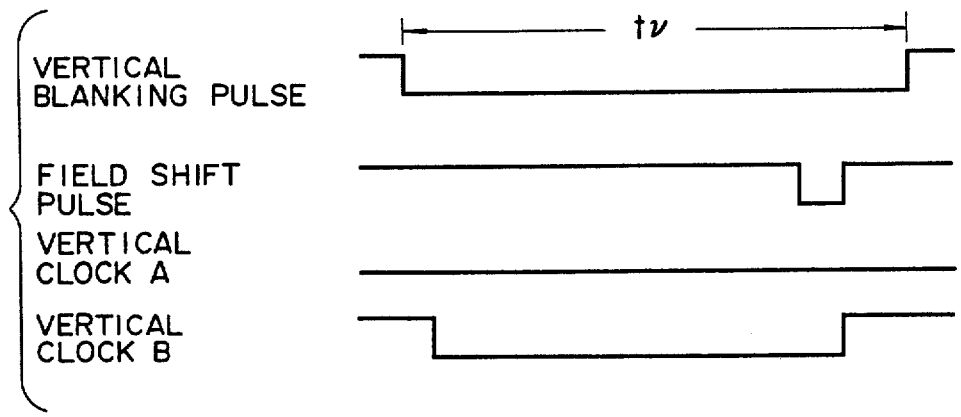
F I G. 3B
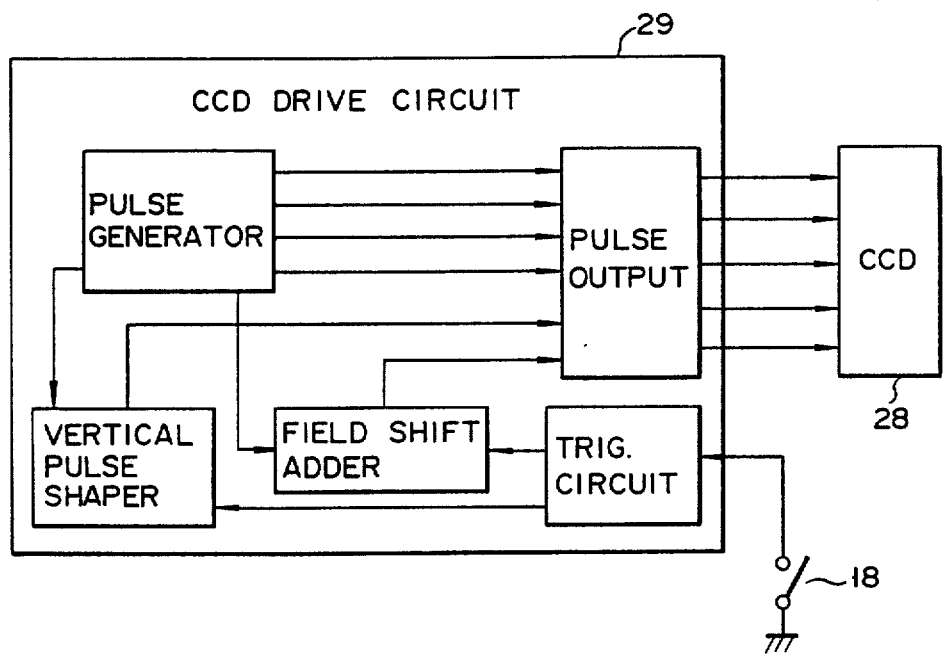
F I G. 4

X-RAY IMAGING APPARATUS

BACKGROUND OF THE INVENTION

1. Field of the Invention

The present invention relates to an X-ray imaging apparatus and, more particularly, to an X-ray imaging apparatus using a TV camera.

2. Description of the Related Art

In order to perform diagnosis, an X-ray imaging apparatus is used to radiate an X-ray to an object to be examined and to perform fluoroscopic observation of an X-ray image converted into an optical image by an image intensifier, or to photograph the X-ray image. In such an X-ray imaging apparatus, a fluoroscopic mode and a photographing mode are switched as required. However, in the fluoroscopic mode, weak X-ray energy beams are continuously radiated, and X-ray images are continuously picked up by a TV camera. Then, the images are displayed on a monitor and visually observed. On the contrary, in the photographing mode, an X-ray energy beam considerably stronger than that in the fluoroscopic mode is radiated, and an instantaneous X-ray image is photographed on a film. In this photographing mode, an optical image having a higher luminance by several tens of times than in the fluoroscopic mode is input to the TV camera, and a high luminance signal is supplied to a monitor. Therefore, in the conventional apparatus, an auto iris is provided at the front surface of the TV camera, and the quantity of light to be input to the TV camera is limited by the auto iris in the photographing mode.

As described above, in the conventional X-ray imaging apparatus, in order to set the quantity of light input to the TV camera to be a proper value, the auto iris, an auto iris control circuit, and the like are required. For this reason, an arrangement of a peripheral optical system of the TV lens and the TV camera is complicated. In addition, since the auto iris is a mechanical stop, reliability of the stop is problematic.

SUMMARY OF THE INVENTION

It is an object of the present invention to provide an X-ray imaging apparatus for controlling the quantity of light by electric control with high reliability.

According to the present invention, a solid-state image sensor is arranged to convert an X-ray optical image formed by an image intensifier into an image signal, and an image sensor drive circuit is arranged to temporarily discharge electric charges stored in the image sensor in a photographing mode. The drive circuit outputs a signal for discharging electric charges and a signal for reading the electric charges to the image sensor during a vertical blanking period. The electric charges previously stored in the image sensor are temporarily discharged, and the electric charges stored after the discharge are read as an image signal. The level of a luminance signal is reduced by discharging the first electric charges, and an image signal having a proper luminance can be obtained by reading the sequentially stored electric charges.

BRIEF DESCRIPTION OF THE DRAWINGS

FIGS. 3A and 3B are a timing chart for explaining a drive state of the solid-state image sensor in a photographing mode; and FIG. 4 is a circuit diagram of a drive circuit.

DETAILED DESCRIPTION OF THE PREFERRED EMBODIMENT

Figure 1:
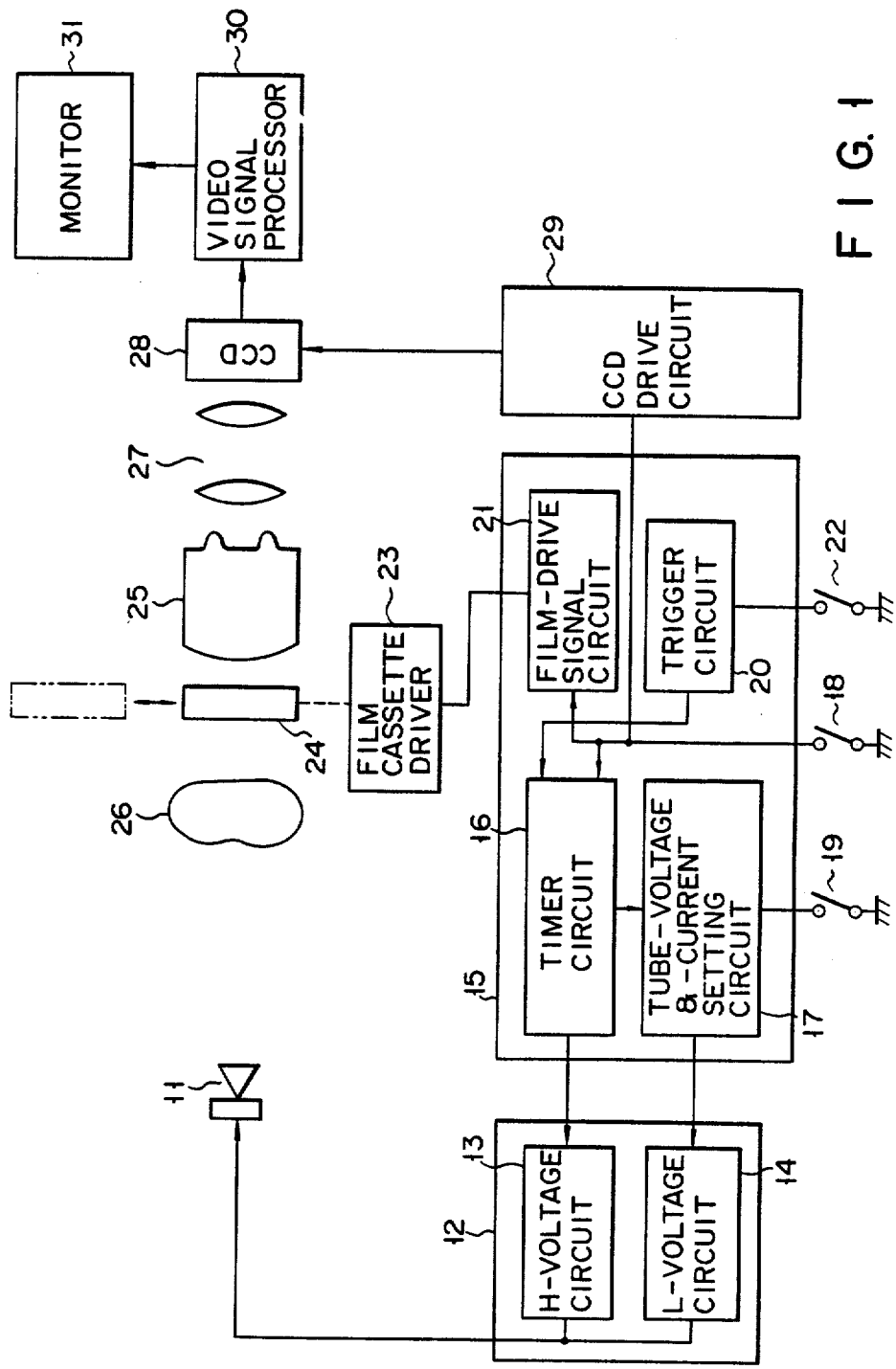
FIG. 1 is a block diagram of an X-ray imaging apparatus according to an embodiment of the present invention.

According to an embodiment shown in FIG. 1, an X-ray tube 11 for radiating an X-ray is connected to a high voltage generating circuit 12. The high voltage generating circuit 12 includes an H-voltage circuit 13 for generating a high voltage for a photographing mode and an L-voltage circuit 14 for generating a low voltage for a fluoroscopic mode. The high voltage generating circuit 12 is connected to an X-ray control circuit 15, and voltage-controlled by the control circuit 15.

The X-ray control circuit 15 includes a timer circuit 16 for setting X-ray radiating time in the photographing mode and a tube voltage and current setting circuit 17 for setting a tube voltage and its current in a fluoroscopic mode. The timer circuit 16 and the tube voltage and current setting circuit 17 are connected to a photographing mode switch 18 and a fluoroscopic mode switch 19, respectively. The X-ray control circuit 15 also includes a trigger circuit 20 and a film drive signal circuit 21. The trigger circuit 20 is connected to a release switch 22 to output a trigger signal to the timer circuit 16 in response to a release operation. The photographing switch 19 and release switch 22 are constituted by a double-stroke switch assembly which includes first switch element closed by a first slightly push and a second switch element closed by a second deeply push with the first switch element being closed.

The film drive signal circuit 21 is connected to the photographing mode switch 18 and a film cassette driver 23 to output a drive signal to the film cassette driver 23 in response to selection of the photographing mode. The film cassette driver 23 moves a film cassette 24. The film cassette 24 is detachably arranged between the X-ray tube 11 and an image intensifier 25. The image intensifier 25 is a device for converting an X-ray passing through an object 26 to be displayed into an optical image. The optical image is projected on a solid-state image sensor (CCD) 28 by an optical system 27.

The CCD 28 is connected to a CCD drive circuit 29, and driven in response to a drive signal from the circuit 29. The output terminal of the CCD 28 is connected to a video signal processor 30. The video signal processor 30 processes an image signal output from the CCD 28 to output a TV signal to a monitor 31.

Figure 2:
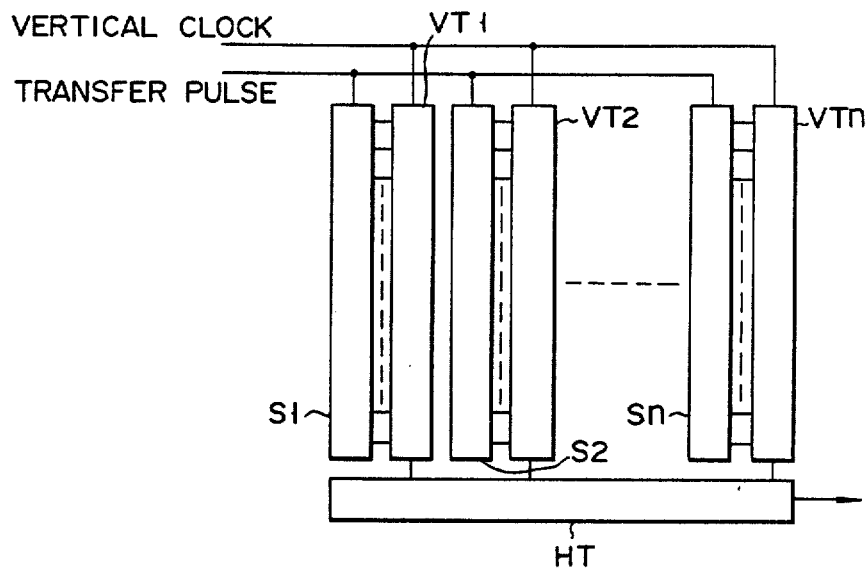
FIG. 2 is a view showing an arrangement of a solid-state image sensor.

As shown in FIG. 2, the CCD 28 is constituted by electric charge storage areas S1, S2, ..., Sn, vertical electric charge transfer areas VT1, VT2, ..., VTn, and a horizontal electric charge transfer area HT. The electric charges stored in the electric charge storage areas S1, S2, ..., Sn are transferred to the vertical electric charge transfer areas VT1, VT2, ..., VTn, and the electric charges in the vertical electric charge transfer areas are transferred to the horizontal electric charge transfer area HT. The electric charges stored in the horizontal electric charge transfer area HT are output to the video signal processor 30 as a horizontal scanning line video signal.

Figure 3A:
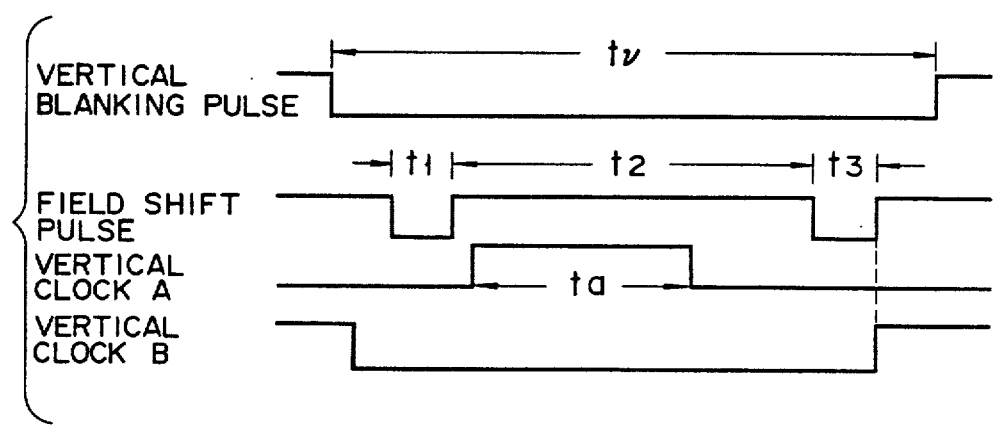

As described above, a drive signal is supplied from the CCD drive circuit 29 to the CCD 28, to drive it. The CCD The drive circuit 29 outputs a drive signal to the CCD 28 in response to a photographing mode signal which is supplied from the X-ray control circuit 15. More specifically, as shown in FIG. 3A, when the CCD drive circuit 29 receives the photographing mode signal, two electric charge transfer signals are sequentially output to gates (not shown) connected to the electric charge storage areas S1, S2, ..., Sn during a vertical blanking period. A signal for discharging the electric charges at a high speed is output to the vertical electric charge transfer areas VT1, VT2, ..., VTn in response to the first electric charge transfer signal. An electric charge reading signal is output to the vertical electric charge transfer areas VT1, VT2, ..., VTn in response to the second electric charge transfer signal. When the CCD drive circuit 29 receives no photographing mode signal, a normal drive signal is output to the CCD 28.

The following is an explanation in more detail with reference to FIGS. 3A, 3B and 4.

FIG. 3A shows a part of a typical pulse train which is sent from CCD drive circuit 29 to CCD 28 when photographing mode switch 18 is ON. FIG. 3B shows a timing chart of a fluoroscopic observation.

FIGS. 3A and 3B explain the differential point of pulse trains and do not shows the actual waveform. For example, in a vertical clock A in FIG. 3B, a pulse has been deleted from the drawing in order to emphasize the difference between these two figures.

As should be clear from a comparison of FIGS. 3A and 3B, the pulse train transferred to CCD 28 in the case where photographing mode switch 18 is switched on (FIG. 3A), and that transferred to CCD 28 in the case where the fluoroscopic operation is selected (FIG. 3B) differ in the number of pulses and presence of high frequency pulse train. When photographing mode switch 18 is switched on (FIG. 3A), the CCD drive circuit 29 generates two field shift pulses and a vertical clock A including a high frequency pulse train for discharging an electric charge at high speed. When the fluoroscopic operation is selected (FIG. 3B), only one field shift pulse is generated.

FIG. 4 illustrates the operation of CCD drive circuit 29. When the photographing mode switch 18 is turned on, the pulse output from the trigger circuit is added to the drive pulse after it is wave-shaped in a vertical pulse shaper. The rigger signal is supplied to a field shift adder, to be added to a field shift pulse.

An operation of an X-ray TV apparatus having the above arrangement will be described hereinafter.

When a power switch is turned on, and the fluoroscopic mode switch 19 is turned on, the tube voltage and current setting circuit 17 sets a tube voltage and its current suitable for fluoroscopy. When a value is set in the L-voltage circuit 14 in the high voltage generating circuit 12, the L-voltage circuit 14 outputs a set tube voltage and its current to the X-ray tube 11. The X-ray tube 11 radiates an X-ray in accordance with the supplied tube voltage and its current to the object to be examined. In this fluoroscopic observation, a relatively weak X-ray is radiated from the X-ray tube 11 for a relatively long period of time. The X-ray passing through the object 26 to be observed is input to the image intensifier 25, and converted into an optical image. The optical X-ray image is projected on the CCD 28 by the optical system 27. In the CCD 28, electric charges corresponding to the optical image are stored in the electric charge storage areas S1, ..., Sn, as shown in FIG. 2. The CCD 28 is controlled by the CCD drive circuit 29 in the fluoroscopic mode, i.e., a regular operation mode. The electric charges stored in the electric charge storage areas S1, ..., Sn are transferred to the vertical electric charge transfer areas VT1, ..., VTn, and further transferred to the horizontal electric charge transfer area HT. A signal output from the horizontal electric charge transfer area HT is output to the video signal processor 30 as a video signal corresponding to the X-ray image. The video signal processor 30 converts the CCD video signal into a TV signal to supply the converted signal to the monitor 31. The monitor 31 displays the TV signal as an X-ray image.

When the X-ray image displayed on the monitor 31 is observed and the portion to be picked up is confirmed, the photographing mode switch 18 is turned on. At this time, the fluoroscopic mode switch 19 is turned off, and the timer circuit 16 and the film drive signal circuit 21 are biased. In the timer circuit 16, X-ray radiating time suitable for X-ray photographing is set, and the film drive signal circuit 21 supplies a drive signal to the film cassette driver 23. The film cassette driver 23 inserts the film cassette 24 between the object 26 to be picked up and the image intensifier 25. A photographing mode signal is input to the CCD drive circuit 29, and the CCD drive circuit 29 is switched to the photographing mode. As described above, when the photographing mode is prepared and the release switch 22 is operated, the trigger circuit 20 outputs a trigger signal to the timer circuit 16. The timer circuit 16 supplies a bias signal to the H-voltage circuit 13 in response to the trigger signal. The H-voltage circuit 13 applies a voltage suitable for picking up the image to the X-ray tube 11. The X-ray tube 11 radiates an X-ray having a higher intensity by several tens of times than in the fluoroscopic mode to the object 26 to be picked up. An X-ray passing through the object 26 to be picked up is converted into an optical image having a high luminance by the image intensifier 25. The high-luminance optical image is formed on the CCD 28 by the optical system 27. In the CCD 28, the electric charges corresponding to the high-luminance optical image are stored in the electric charge storage areas S1, ..., Sn. In the photographing mode, a transfer pulse is input to the electric charge storage areas S1, ..., Sn at the beginning of a vertical blanking period tv of a vertical blanking pulse. All the electric charges previously stored in the electric charge storage areas S1, ..., Sn are transferred to the vertical electric charge transfer areas VT1, ..., VTn during a period T1 of the transfer pulse. From a moment immediately after the electric charge transfer is completed, the electric charges corresponding to the optical image are stored in the electric charge storage areas S1, ..., Sn again.

At the end of the electric charge transfer as described above, a vertical clock A is input to the vertical electric charge transfer areas VT1, ..., VTn. The frequency of the pulse train in the clock A is increased during a pulse-width period ta, the electric charges stored in these areas are externally discharged through the horizontal transfer area HT at a high speed. After the discharge of the electric charges in the electric charge transfer areas is completed, the transfer pulse is input to the electric charge storage areas again. At this time, the electric charges stored during a pulse interval t2 (e.g., period of 10 horizontal scanning lines: 10 H) between the first and second transfer pulses are transferred to the electric charge storage areas VT1, ..., VTn during a period t3. The transferred electric charges are transferred to the horizontal transfer area HT in response to a vertical clock B, and read from the horizontal transfer area HT as a video signal.

As described above, the video signal read from the CCD 28 is input to the video signal processor 30, and processed. The processed signal is supplied to the monitor 31, and displayed as an image. An exposure period is determined by the timer circuit 16. After image picking-up is completed, switching to the fluoroscopic mode is performed again. This mode switching is performed by inputting a photographing end signal from the timer circuit 16 to the tube voltage and current setting circuit 17. Thus, the fluoroscopic observation and image picking-up can be alternately and sequentially performed.

As described above, in the photographing mode, the electric charges previously stored are discharged, and the electric charges stored in 10 H are read as a video signal. In other words, only the electric charges for 10 H in one field (262.5H) are used. This corresponds to a decrease in sensitivity, i.e., luminance to 10/262.5. Therefore, even if an optical image having a luminance about twenty times that in the fluoroscopic mode is input to the CCD 28 in the photographing mode, a video signal having a proper level based on the above-mentioned substantial sensitivity is supplied to the video signal processor 30, and the video signal can be displayed on the monitor 31 as an image having a proper luminance.

As has been described above, according to the present invention, since the proper amount of electric charges stored in the CCD are discharged and the quantity of input light is substantially adjusted, the conventional mechanical stop such as an auto iris is not required. Therefore, the structure of the optical system can be greatly simplified, and the reliability of the X-ray TV apparatus can be improved. In addition, the storage period (10 H) of the electric charges of the read image can be arbitrarily set, and luminance adjustment can be performed in units of 1 H.

What is claimed is:

1. An X-ray imaging apparatus comprising:
    X-ray generating means for radiating an X-ray to an object to be examined;
    X-ray/optical image converting means for converting the X-ray passing through said object to be examined into an optical image;
    solid-state image sensor means having electric charge storage areas for storing electric charges corresponding to the optical image obtained by said converting means and electric charge transfer areas for transferring the electric charges stored in said electric charge storage areas, for outputting transferred electric charges as a video signal;
    mode selecting means for selecting a fluoroscopic mode for visually observing an X-ray image and a photographing mode for picking up the X-ray image;
    X-ray driving means for driving said X-ray generating means to selectively generate a low-level X-ray suitable for the fluoroscopic mode and a high-level X-ray suitable for the photographing mode from said X-ray generating means; and
    drive circuit means for driving said solid-state image sensor means to discharge a predetermined amount of electric charges stored in said electric charge storage areas in said solid-state image sensor means in order to adjust the luminance of the video signal in the photographing mode.

2. An apparatus according to claim 1, wherein said drive circuit means comprises means for outputting a field shift pulse signal for transferring the electric charges stored in said electric charge storage areas to said electric charge transfer areas, and a vertical clock signal for outputting and transferring the electric charges stored in said electric charge transfer areas as the video signal to said solid-state image sensor means, said field shift pulse signal including first and second field shift pulses during a vertical blanking period, the first field shift pulse driving said electric charge storage areas to discharge the stored electric charges, and the following second field shift pulse driving said electric charge storage areas to read the stored electric charges as a signal.

3. An apparatus according to claim 2, wherein a period between the two field shift pulses corresponds to a predetermined number of horizontal scanning lines.

4. An apparatus according to claim 3, wherein a period between the two field shift pulses corresponds to 10 horizontal scanning lines.

5. An apparatus according to claim 1, wherein said X-ray driving means comprises voltage generating means for outputting a first voltage to said X-ray generating means in response to selection of the fluoroscopic mode, and outputting a second voltage higher than the first voltage to said X-ray generating means in response to selection of the photographing mode.

6. An apparatus according to claim 1, wherein film cassette means is detachably arranged between said object to be examined and said converting means, and said X-ray driving means comprises means for inserting said film cassette means between said object to be examined and said converting means in response to selection of the photographing mode.

7. An X-ray imaging apparatus comprising:
    X-ray generating means for radiating an X-ray to an object to be examined;
    image intensifier means for converting the X-ray passing through said object to be examined into an optical image;
    solid-state image sensor means having electric charge storage areas for storing electric charges corresponding to the optical image obtained by said image intensifier means and electric charge transfer areas for transferring the electric charges stored in said electric charge storage areas, for outputting transferred electric charges as a video signal;
    mode selecting means for selecting a fluoroscopic mode for visually observing an X-ray image and a photographing mode for picking up the X-ray image;
    display means for displaying the video signal output from said solid-state image sensor means as the X-ray image;
    picking-up means for picking up the X-ray passing through said object to be examined as an X-ray photograph;
    X-ray driving means for driving said X-ray generating means to selectively generate a low-level X-ray suitable for the fluoroscopic mode and a high-level X-ray suitable for the photographing mode from said X-ray generating means; and
    drive circuit means for outputting a drive signal to said solid-state image sensor means in response to selection of the photographing mode to discharge a predetermined amount of electric charges stored in said electric charge storage areas in said solid-state image sensor means in order to adjust a luminance of the video signal.

8. An apparatus according to claim 7, wherein said picking-up means comprises film cassette means inserted between said object to be examined and said image intensifier means.

9. An apparatus according to claim 7, wherein said solid-state image sensor means outputs the electric charges stored in said electric charge storage areas to said display means as the video signal after the electric charges are discharged by said driving means.

10. An apparatus according to claim 7, wherein said drive circuit means comprises means for outputting a field shift pulse signal for transferring the electric charges stored in said electric charge storage areas to said electric charge transfer areas, and a vertical clock signal for outputting and transferring the electric charges stored in said electric charge transfer areas as the video signal to said solid-state image sensor means, said field shift pulse signal including two field shift pulses during a vertical blanking period, the first field shift pulse driving said electric charge storage areas to discharge the stored electric charges, and the sequential field shift pulse driving said electric charge storage areas to read the stored electric charges as a signal.

11. An apparatus according to claim 10, wherein a period between the two transfer pulses corresponds to a predetermined number of horizontal scanning lines.

12. An apparatus according to claim 7, wherein said mode selecting means alternately selects the fluoroscopic mode and the photographing mode.

* * * * *

UNITED STATES PATENT AND TRADEMARK OFFICE
CERTIFICATE OF CORRECTION

PATENT NO. : 4,901,337
DATED : February 13, 1990
INVENTOR(S) : Yuichi Fujimoto It is certified that error appears in the above-identified patent and that said Letters Patent is hereby corrected as shown below:

ON TITLE PAGE:

[30] <u>Foreign Application Priority Data</u>

Please change "May 18, 1988" to --May 12, 1988--;

[57] <u>In the Abstract</u>

Line 1, change "AN" to --An--.

Signed and Sealed this

Fourth Day of August, 1992

Attest:

DOUGLAS B. COMER

*Attesting Officer*     *Acting Commissioner of Patents and Trademarks*